(12) United States Patent
Finn et al.

(10) Patent No.: US 11,410,298 B2
(45) Date of Patent: Aug. 9, 2022

(54) SYSTEM AND METHOD FOR DETERMINING PART DAMAGE

(71) Applicant: United Technologies Corporation, Farmington, CT (US)

(72) Inventors: Alan Matthew Finn, Chapel Hill, NC (US); Jose Miguel Pasini, Avon, CT (US); Edgar A. Bernal, Webster, NY (US); Ozgur Erdinc, Mansfield, CT (US); Ziyou Xiong, Wethersfield, CT (US); Gene B. Donskoy, Farmington, CT (US); Sergio S. Frutuoso, Avon, CT (US); Joseph A. Sylvestro, Avon, CT (US); Richard W. Osborne, III, Stafford Springs, CT (US); Olusegun T. Oshin, Manchester, CT (US); William L. Rall, Fort Worth, TX (US)

(73) Assignee: Raytheon Technologies Corporation, Farmington, CT (US)

( * ) Notice: Subject to any disclaimer, the term of this patent is extended or adjusted under 35 U.S.C. 154(b) by 719 days.

(21) Appl. No.: 16/210,800

(22) Filed: Dec. 5, 2018

(65) Prior Publication Data

US 2019/0172191 A1 Jun. 6, 2019

Related U.S. Application Data

(60) Provisional application No. 62/594,820, filed on Dec. 5, 2017.

(51) Int. Cl.
*G06T 7/00* (2017.01)
*G01M 15/14* (2006.01)
(Continued)

(52) U.S. Cl.
CPC .............. *G06T 7/001* (2013.01); *G01B 21/00* (2013.01); *G01B 21/042* (2013.01);
(Continued)

(58) Field of Classification Search
None
See application file for complete search history.

(56) References Cited

U.S. PATENT DOCUMENTS 7,574,035 B2 * 8/2009 Koonankeil ............ F01D 5/005
348/86
8,208,711 B2 6/2012 Venkatachalam et al.
(Continued)

FOREIGN PATENT DOCUMENTS

DE 19710743 A1 9/1998
JP 2015161246 A 9/2015
JP 2015161247 A 9/2015

*Primary Examiner* — Stuart D Bennett
(74) *Attorney, Agent, or Firm* — Bachman & LaPointe, P.C.

(57) ABSTRACT

A process for automated component inspection includes the steps of calibrating an imaging device mounted on a table; calibrating a coordinate measuring machine mounted on the table, the coordinate measuring machine comprising a fixture coupled to an arm of the coordinate measuring machine; coupling a component to the fixture; acquiring an image of said component with said imaging device; registering a baseline dimensioned image to the component image; applying the baseline dimensioned image to a damage detection algorithm; and determining component damage by the damage detection algorithm.

13 Claims, 3 Drawing Sheets

(51) Int. Cl.
  *G01B 21/00*  (2006.01)
  *G02B 21/00*  (2006.01)
  *G02B 21/36*  (2006.01)
  *G01B 21/04*  (2006.01)
  *G06T 7/80*  (2017.01)

(52) U.S. Cl.
  CPC ......... *G01M 15/14* (2013.01); *G02B 21/0016* (2013.01); *G02B 21/365* (2013.01); *G06T 7/80* (2017.01); *G06T 2207/10056* (2013.01); *G06T 2207/30164* (2013.01)

(56) References Cited

U.S. PATENT DOCUMENTS

| | | |
|---|---|---|
| 8,744,166 B2 | 6/2014 | Scheid et al. |
| 8,761,490 B2 | 6/2014 | Scheid et al. |
| 8,781,209 B2 | 7/2014 | Scheid et al. |
| 8,781,210 B2 | 7/2014 | Scheid et al. |
| 8,792,705 B2 | 7/2014 | Scheid et al. |
| 9,251,582 B2 | 2/2016 | Lim et al. |
| 2004/0170315 A1* | 9/2004 | Kosaka ................... G06T 5/006 382/154 |
| 2012/0188380 A1* | 7/2012 | Drescher ............... G06T 7/0004 348/180 |
| 2015/0051860 A1* | 2/2015 | Zuo .......................... G07C 3/14 702/82 |
| 2015/0240788 A1 | 8/2015 | Kayama et al. |
| 2016/0114595 A1* | 4/2016 | Dunlop ............. H01L 21/67259 347/110 |
| 2017/0132775 A1* | 5/2017 | Ramamurthy ....... G06K 9/6202 |
| 2017/0211927 A1* | 7/2017 | Bridges .................. G01B 5/012 |
| 2017/0284971 A1* | 10/2017 | Hall ....................... G01B 5/012 |
| 2020/0209163 A1* | 7/2020 | O'Loughlin ........... G01B 11/00 |

\* cited by examiner

SYSTEM AND METHOD FOR DETERMINING PART DAMAGE

CROSS REFERENCE TO RELATED APPLICATION

This application claims the benefit of provisional application Ser. No. 62/594,820, filed Dec. 5, 2017.

BACKGROUND

The present disclosure is directed to a system and method for determining part damage. More particularly, an automated system and method of inspecting mechanical components, especially turbine blades based on prior knowledge of expected blade size and shape.

Mechanical components may incur imperfections during manufacturing and may suffer wear and damage during operation. These components are episodically or periodically inspected for imperfections, damage, deformation, and wear. In particular, mechanical components such as turbine blades have complex mechanical shapes that are difficult to manufacture and are operated under stresses that cause damage. For example, damage to blades caused from foreign objects can include leading edge erosion, hot corrosion (sulfidation), cracks, and dents, nicks, gouges, and the like. The damaged blades are currently inspected manually by visual inspection, see FIG. 1, or by non-destructive evaluation (NDE) techniques such as eddy current, ultrasound, or fluorescent penetrant inspection. The state of the art inspections can be tedious, time consuming, imprecise, and error prone.

Turbine blade damage detection can be demonstrated by previous techniques described in documents such as, JP2015161247A using embedded vibro-acoustic sensing and JP2015161246A using strain sensing. These techniques utilize embedded or contacting sensors and are intended for wind turbines where the blades are not exposed to the impact, erosion, or corrosion that gas turbine blades are exposed.

Blade damage detection for gas turbines has been discussed in the document DE19710743A1, which teaches using eddy current sensors or by using mechanical touch probes, such as a coordinate measuring machine (CMM), but these require slow, laborious scanning of the blade surface.

These patent documents U.S. Pat. Nos. 8,781,210; 8,781,209; 8,792,705; 8,744,166; and 8,761,490 discuss a variety of processes that include use of borescope video of blades in an engine to determine damage. This approach analyzes two dimensional (2D) images for differences between the current image and a model learned from other 2D images in a blade row. This is not suitable for determining damage in absolute units for components outside an engine.

Other 2D (image-based) inspection systems have been discussed, e.g., U.S. Pat. No. 9,251,582, wherein many steps are performed to determine the pose of an inspection device (a camera) with respect to the part and an a priori engineering model so that differences between the part and the model may be determined. This particular approach is unnecessarily inefficient and error prone.

There is also a discussion in U.S. Pat. No. 8,208,711 B2 that teaches the use of X-rays for inspection, which requires special, shielded equipment. There is further discussion in the open literature, also for 2D image inspection of gas turbine blades, to estimate whether they have been exposed to excessive temperature, but that technique is ineffective for detecting damage to the shape or features of the blade.

Several automated inspection processes have been developed based on rapid exterior heating of the component and infrared imaging. For instance, pulsed thermography, which utilizes a very short and intense flash of light that heats a component, has been used to show thermal conductivity of a coating. These methods, however, require external heating of the component, may not allow detection of all the desired imperfections, and currently lack automated image analysis for the determination of imperfections and damage.

Methods based on 3D analytics have been developed, but these methods require high resolution 3D scans, which can be slow. The above mentioned documents are incorporated herein by reference.

What is needed is an automated method of inspecting mechanical components, especially turbine blades, which effectively and efficiently exploits prior knowledge of expected size and shape.

SUMMARY

In accordance with the present disclosure, there is provided a process for automated component inspection includes the steps of calibrating an imaging device mounted on a table; calibrating a coordinate measuring machine mounted on the table, the coordinate measuring machine comprising a fixture coupled to an arm of the coordinate measuring machine; coupling a component to the fixture; acquiring an image of said component with said imaging device; registering a baseline dimensioned image to the component image; applying the baseline dimensioned image to a damage detection algorithm; and determining component damage by the damage detection algorithm.

In another and alternative embodiment, a system for automated component inspection comprises a table; an imaging device mounted on a table; a coordinate measuring machine mounted on the table, the coordinate measuring machine comprising a fixture coupled to an arm of the coordinate measuring machine; and a component is coupled to the fixture.

Other details of the process and system for automated component inspection are set forth in the following detailed description and the accompanying drawings wherein like reference numerals depict like elements.

DETAILED DESCRIPTION

Figure 1:
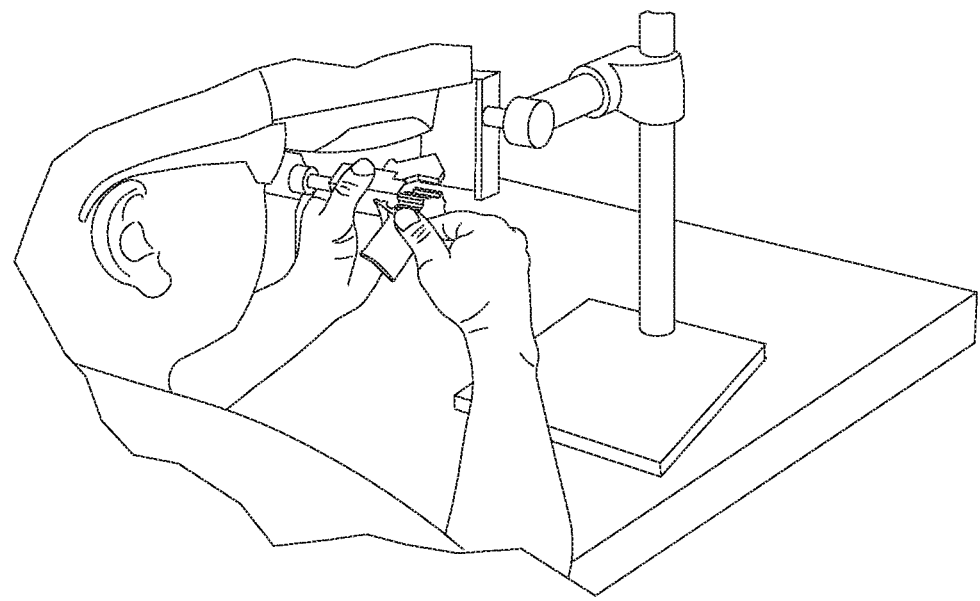
FIG. 1 is a schematic image of a prior art manual inspection utilizing an industrial microscope.
Figure 2:
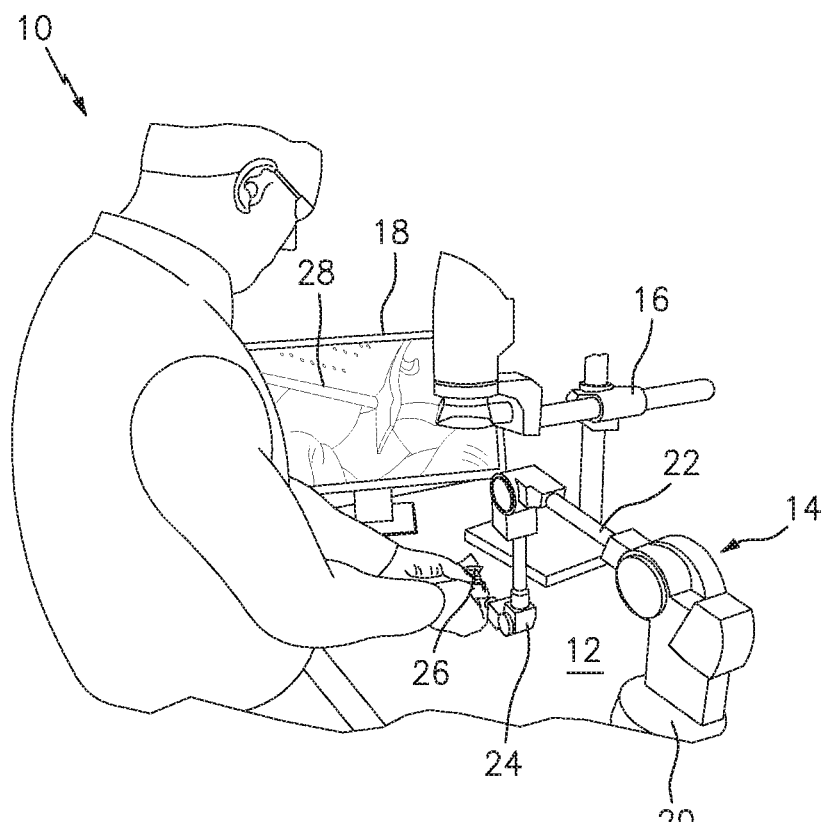
FIG. 2 is an exemplary system for automated component inspection.

Referring to FIG. 2, an exemplary system for automated component inspection 10 is shown. The system 10 includes a precision measuring table 12 configured for precise measurement, such as a precision granite table top. In an alternate embodiment the precision measuring table is any sufficiently stiff table or multifaceted mounting surface that the devices affixed thereto do not change relative position or orientation during use more than can be compensated by a registration process (described below). The precision measuring table provides a precise datum for mounting a coordinate measuring machine (CMM) 14 and an imaging device 16 such as a microscope and a monitor 18. The imaging device 16 may be any measurement device capable of rendering 2D arrays of measurements and is explicitly contemplated as comprising a visible spectrum camera, an infrared camera, a depth sensor, and the like. The coordinate measuring machine 14 includes a base 20 coupled to the table 12. The base 20 supports an arm mechanism or simply arm 22 that can be articulated about 3 different axes to provide six degrees of freedom (6DOF). In an alternative embodiment, the base 20 is coupled to a surface that is itself coupled to, but not coplanar with, table 12. The arm 22 supports a fixture 24 configured to attach a component 26. The coordinate measuring machine 14 is a device for measuring the physical geometrical characteristics of an object. This machine may be manually controlled by an operator or it may be computer controlled. The CMM arm 22 can be calibrated using vendor-supplied techniques.

In an exemplary embodiment, the fixture 24 can be transparent allowing all surfaces of the component 26 to be viewed/imaged by the imaging device 16. In an exemplary embodiment, the fixture 24 is made of an optically transparent material. Such material preferably has high transparency and high toughness. One example material would be Polymethylmethacrylate (PMMA). The material need not be highly rigid providing it does not change the relative position or orientation of component 26 during use more than can be compensated by a registration process (described below). In an alternate embodiment fixture 24 may be made of metallic glass, gorilla glass, sapphire, polycarbonate, and the like. The fixture 24 has known physical dimensions. The fixture 24 can include a shape that conforms to the shape of the component 26. In an exemplary embodiment, if the component 26 is a blade, the fixture 24 can have a convoluted shape that conforms to the fire tree of the root of the blade, such that the root of the blade is supported by the fixture 24. The component 26 can then be precisely located relative to the CMM 14 and the table 12.

The component 26, such as a turbine engine blade, is coupled to the fixture 24 of the arm 22 of the CMM 14, at a location typically occupied by a probe (not shown). Measurements of the component 26 are defined by the component attached to the arm of the CMM 14. The CMM 14 provides data that reports the component 26 location and pose in all 6 degrees of freedom (6 DOF).

The imaging device 16 is also mounted on the table 12. The precise location of the imaging device 16 relative to the table 12 is determined. The precise location of the imaging device 16 and coordinate measuring machine 14 can be determined based on the table 12 as a datum. The imaging device 16 is positioned to view the component 26 coupled to the fixture 24 of the arm 22. The imaging device 16 is configured to produce a precise image 28 of the component 26. In an exemplary embodiment, the intrinsic parameters of an industrial microscope are estimated using a calibration pattern. The imaging device 16 extrinsic parameters can be estimated with a 3D calibration jig.

Figure 3:
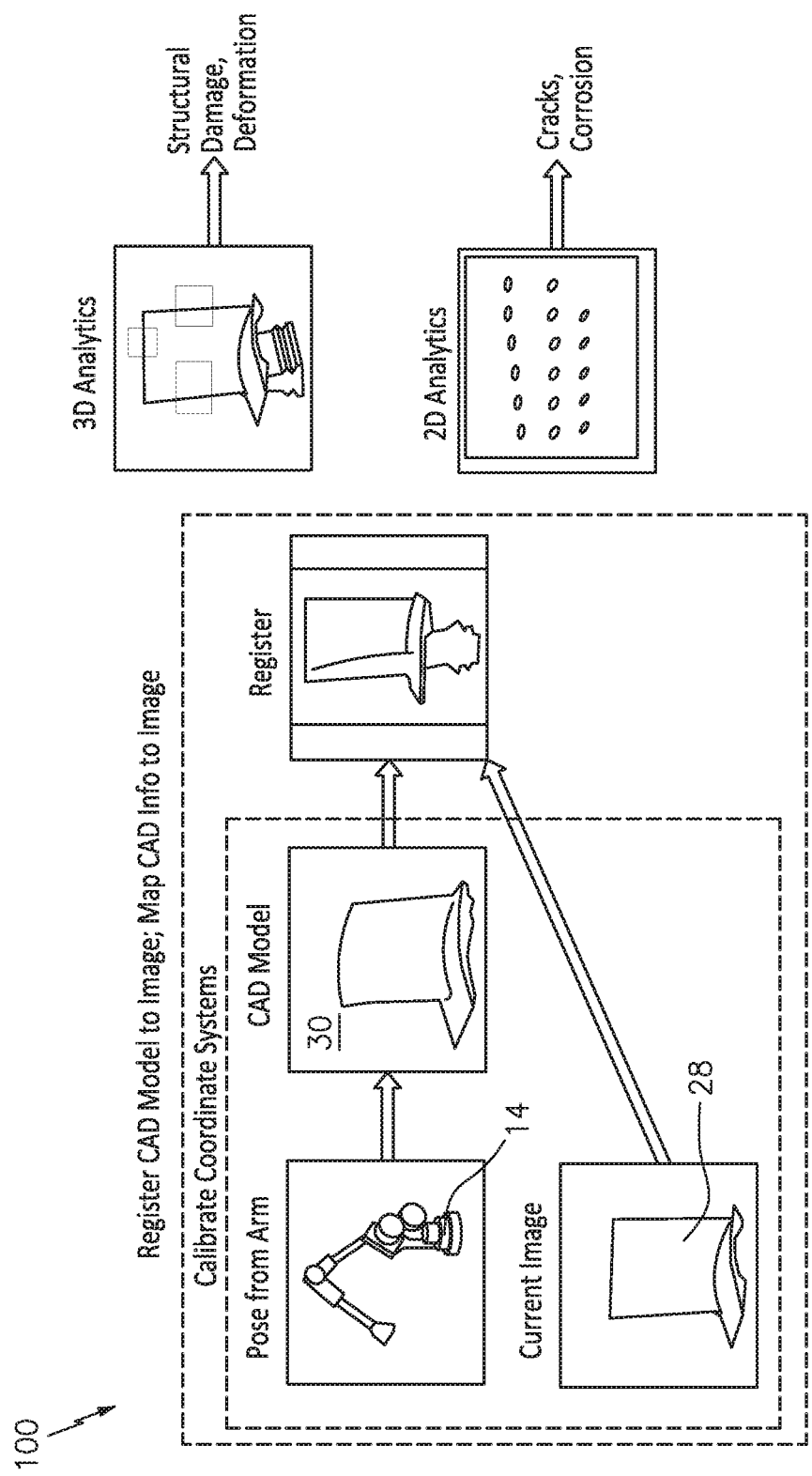
FIG. 3 is a schematic diagram of an exemplary process for automated component inspection.

The coordinate measuring machine 14 can be used in the novel process to test the component 26 imaged by the imaging device 16 against a baseline dimensioned image 30 (shown in FIG. 3). The system 10 can precisely record the X, Y, and Z location coordinates and the ρ, θ, φ angles of the component 26, which can then be analyzed via regression algorithms for the construction of features as compared against the baseline dimensioned image 30. The microscope component image 28 location is used to select damage detection algorithm(s) and parameters.

A subset of damage detection algorithm(s) may be selected for execution upon determination of the location of the component 26 within image 28. For instance, the execution of corrosion detection algorithms may be triggered only when it is determined that portions of the part that are susceptible to corrosion are in view. In an alternative embodiment, known a priori information about the probability of damage by location may be applied to possible damage detections in the image 28 by Bayesian Estimation. For instance, a possible crack detection becomes much more probable if it originates at a known stress concentration location.

The baseline dimensioned image 30 can include a design drawing, a CAD model projection, an image of a prototypical component, a previous 3D scan projection of component 26, and the like. In an exemplary embodiment, a known 3D model of the component 26 can be registered to the imaging device 16 image 28 of the component 26. The differences between the imaging device 16 image 28 and baseline dimensional image model 30 are used to determine structural damage of the component 26. The structural damage can be classified by a novel damage mode physical model. That is, the damage may be decomposed into physical modes by, for instance, a sparse dictionary matching process, where the dictionary elements are damage modes.

The monitor 18 can receive the output of the imaging device 16 to produce the visible image 28 of the component 26.

Figure 4:
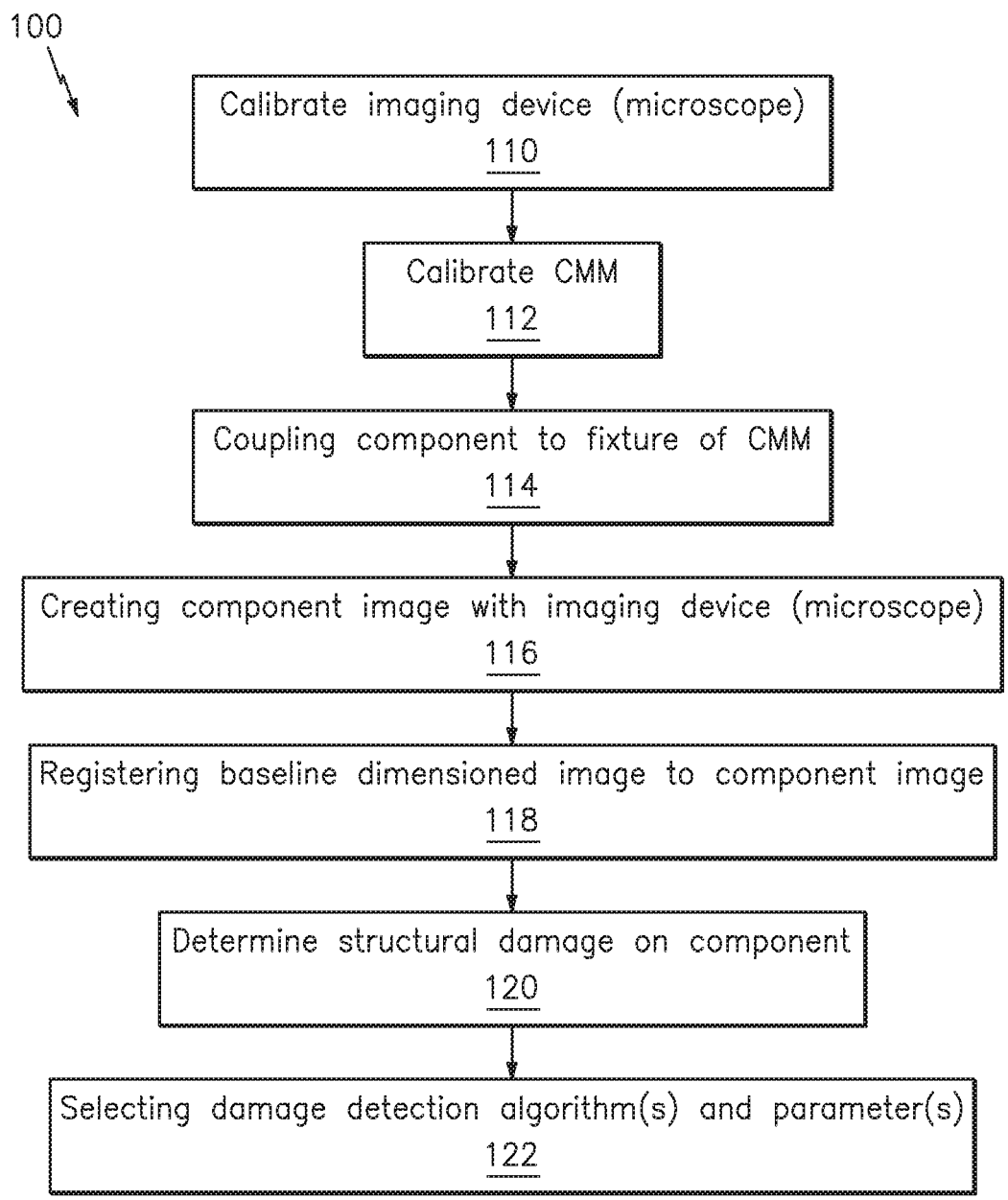
FIG. 4 is a process map of an exemplary process for automated component inspection.

The exemplary process 100 can be described with use of FIG. 3 and FIG. 4. The process at step 110 can be initiated by calibrating the imaging device 16. The imaging device 16 can be calibrated by utilizing intrinsic parameters and a calibration pattern. A 3-dimension calibration jig can be utilized to estimate the imaging device 16 extrinsic parameters.

The process continues by calibrating the coordinate measuring machine 14 arm 22 at step 112. The coordinate measuring machine 14 arm 22 can be calibrated using vendor supplied-techniques.

In the next step 114, the component 26 is coupled/installed to the fixture 24 of the coordinate measuring machine 14. The fixture 24 has known physical dimensions.

The component image 28 is created by the imaging device 16, at step 116. At step 118, the baseline dimensioned image 30, such as a known 3D model, is registered to the imaging device image 28 utilizing the information generated from steps 110, 112, and 114. In an exemplary embodiment, the registration can be accomplished by a damage-invariant method. In one embodiment, the damage-invariant registration includes adding parameterized terms to the registration cost function and optimizing over those parameters. For instance, a parameter multiplying the model length may be included in the cost function. Optimizing over the length parameter will provide a good registration even if the component has suffered a kind of damage called 'creep', i.e., the component is now longer than when originally manufactured. Further, the value of the length parameter provides a measurement of the amount of creep.

The next step 120 is determining structural damage by comparing the differences between the imaging device component image 28 and the 3D model 30. This step 120 can include applying the baseline dimensioned image to a damage detection algorithm; and determining component 26 damage by use of the damage detection algorithm.

In an exemplary embodiment, the structural damage can be classified by a damage mode physical model.

The next step 122, includes selecting damage detection algorithm(s) and parameters based on the location of the microscope component image 28. The detected damage can be structural damage. The detection of the component damage can be by physical mode decomposition. The component damage detected can be one or more of a crack, a nick, a gouge, and corrosion. The method of component damage detection can include one or more of algorithm selection, parameter selection, and Bayesian estimation.

The exemplary automated (or semi-automated) process of inspecting mechanical components, especially turbine blades, effectively and efficiently exploits prior knowledge of absolute size and expected shape.

An exemplary aspect of the present disclosure is the use of a coordinate measuring machine (CMM) arm/fixture attached to the component under inspection (which is not the typical use of a CMM arm) whereby the arm reports the component location and pose in all 6 degrees of freedom (6 DOF).

The exemplary process is unique in (1) use of a 6 DOF CMM arm as a component localization and pose measurement system, (2) use of 6 DOF localization and pose to efficiently register a model to a part under inspection in a damage-invariant way, (3) use of a registered model, an image, and a physics-based deformation model to determine structural damage and characterization, and (4) use of a registered model, a zoom measurement, and an image to provide localization priors to non-structural damage detection and characterization.

The exemplary process for automated component inspection (i) improves accuracy, consistency, and coverage, (ii) provides trending and lifting data, and (iii) reduces training and workforce costs.

There has been provided an exemplary process for automated component inspection. While the exemplary process for automated component inspection has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process for automated component inspection comprising:
    calibrating an imaging device mounted on a table;
    calibrating a coordinate measuring machine mounted on said table, said coordinate measuring machine comprising a fixture coupled to six degree of freedom arm of said coordinate measuring machine configured as a localization and pose measurement system;
    coupling a component to said fixture; whereby the six degree of freedom arm reports the component location and pose in all six degrees of freedom; wherein the component is a turbine blade;
    acquiring an image of said component with said imaging device;
    registering a baseline dimensioned image to said component image, wherein said baseline dimensioned image is selected from the group consisting of a design drawing, a CAD model projection, and a prior 3D scan projection;
    applying said baseline dimensioned image to a damage detection algorithm using the reported location and pose; and
    determining component damage by said damage detection algorithm.

2. The process according to claim 1, wherein said imaging device is a microscope.

3. The process according to claim 2, wherein said microscope is calibrated by estimating intrinsic parameters with a calibration pattern.

4. The process according to claim 3, wherein a three dimension calibration jig is utilized to estimate the microscope extrinsic parameters.

5. The process according to claim 1, wherein said step of registering a baseline dimensioned image to said component image further comprises a damage-invariant method.

6. The process according to claim 1, wherein said step of determining structural damage further comprises comparing the differences between the component image and the baseline dimensioned image.

7. The process according to claim 1, wherein said component damage is structural damage.

8. The process according to claim 1, wherein said component damage determination is by physical mode decomposition.

9. The process according to claim 1, wherein said component damage is at least one of a crack, a nick, a gouge, and corrosion.

10. The process according to claim 1, wherein said component damage determination includes at least one of an algorithm selection, a parameter selection, and a Bayesian estimation.

11. A system for automated component inspection comprising:
    a table;
    an imaging device mounted on a table, wherein said imaging device is configured to create a component image, and the system is configured to register a baseline dimensioned image to said component image for determining structural damage on said component by applying said baseline dimensioned image to a damage detection algorithm using a reported location and pose; and determining component damage by a damage detection algorithm, wherein said baseline dimensioned image is selected from the group consisting of a design drawing, a CAD model projection, a prior 3D scan projection;
    a coordinate measuring machine mounted on said table, said coordinate measuring machine comprising a fixture coupled to six degree of freedom arm of said coordinate measuring machine configured as a localization and pose measurement system; and
    a component gas turbine engine blade coupled to said fixture; whereby the six degree of freedom arm reports the component location and pose in all six degrees of freedom.

12. The system according to claim 11, wherein said imaging device is a microscope.

13. The system according to claim 11, wherein said fixture comprises a transparent material configured to allow surfaces of the component to be viewed.

* * * * *